United States Patent [19]
Erdley

[11] 3,974,701
[45] Aug. 17, 1976

[54] SPIN COUPLED, ANGULAR RATE SENSITIVE INERTIAL SENSORS WITH OPTIONAL ACCELERATION SENSING CAPABILITY AND METHOD OF FABRICATING SAME

[75] Inventor: Harold F. Erdley, Los Angeles, Calif.

[73] Assignee: Teledyne Industries, Inc., Los Angeles, Calif.

[22] Filed: Aug. 28, 1975

[21] Appl. No.: 608,770

[52] U.S. Cl. .................................. 73/504; 73/511; 74/5 F
[51] Int. Cl.² ..................... G01P 9/02; G01P 15/02
[58] Field of Search ............. 73/504, 505, 510, 511; 74/5 F, 5 R

[56] References Cited
UNITED STATES PATENTS

| | | | |
|---|---|---|---|
| 3,301,073 | 1/1967 | Howe | 74/5 F |
| 3,306,115 | 2/1967 | Granqvist | 74/5 R |
| 3,576,133 | 4/1971 | Krupick | 74/5 F |

*Primary Examiner*—James J. Gill
*Attorney, Agent, or Firm*—Blakely, Sokoloff, Taylor & Zafman

[57] ABSTRACT

Spin coupled angular rate sensitive inertial sensors of the tuned suspension system type, and method of fabricating such sensors whereby the twice spin frequency linear and angular vibration sensitivity characteristic of tuned sensors may be eliminated. The twice spin frequency angular vibration sensitivity characteristic of other tuned inertial sensors is eliminated by creating an equal and opposite torque component dependent on the same vibrational input. This is done by angularly offsetting the rotor suspension system from a plane orthogonal to the spin axis, and by providing the shaft assembly with an effective product of inertia of controlled magnitude and orientation. The product of inertia modulates any twice spin frequency angular vibration of the shaft about an axis orthogonal to the spin axis with the spin frequency of the shaft to provide an angular disturbance of the shaft about the spin axis. This spin frequency angular disturbance in combination with the inclination of the rotor suspension system causes the compensating twice spin frequency torque component on the rotor, which may be controlled as appropriate by adjusting the magnitude and position of the product of inertia on the shaft.

Similar compensating effects for twice spin frequency linear vibration may be achieved by an appropriate effective radial unbalance of the shaft assembly. Various forms of implementation of the invention and methods of dynamically balancing the rotating assemblies are disclosed. Control of the zero frequency or twice spin frequency torques on the rotor may be controlled by the methods disclosed.

48 Claims, 9 Drawing Figures

SPIN COUPLED, ANGULAR RATE SENSITIVE INERTIAL SENSORS WITH OPTIONAL ACCELERATION SENSING CAPABILITY AND METHOD OF FABRICATING SAME

BACKGROUND OF THE INVENTION

1. Field of the Invention

The present invention relates to precision inertial instruments, and more particularly to rotating, mechanically tuned gyroscope and/or accerometer devices.

2. Prior Art

The present invention comprises apparatus and techniques for substantially eliminating a major source of disturbance and errors in a certain class of inertial sensors by making certain changes and additions to the structure thereof. This allows the practical implementation of inertial grade sensors for producing two axis angular rate information and two axis acceleration information utilizing a single sensitive element. The invention may also be utilized in various prior art instruments to subdue one of the most troublesome sources of error in such instruments; twice spin frequency vibration induced torques.

The prior art patents describing certain types of prior art instruments and apparatus of the general type or class to which the present invention pertains includes U.S. Pat. No. 3,678,764 to H. F. Erdley, et al; U.S. Pat. No. 3,354,726 to W. J. Krupick, et al; U.S. Pat. No. 3,301,073 and U.S. Pat. No. 3,702,568 to E. W. Howe; U.S. Pat. No. 3,832,906 to R. J. G. Craig; U.S. Pat. No. 3,543,301 to D. Barnett; and U.S. Pat. No. 3,700,290 to W. B. Ensinger. Pertinent publications include the article entitled "Dynamically Tuned Free Rotor Gyroscope" published in Control Engineering of June, 1964 pages 67–72 (A. W. Howe) and AIAA Paper No. 65-435 delivered at the AIAA meeting in San Francisco, California, July 26–29, 1965, the paper entitled "Dynamics of Ideal Suspensions Applied to Rotating Bodies in Space".

As the foregoing prior art discloses, various mechanizations of rotating, mechanically tuned suspension systems have been successfully employed as the fundamental supporting means for precision inertial instruments, principally gyroscopic rotors having two degrees of freedom. These suspension systems are generally made up of one or more tuned gimbal-torsion spring support combinations, which ideally result in a zero value for one of the two dynamic natural frequencies of the rotating system, and a value of slightly lower than twice the rotation frequency for the other natural frequency, the nutation frequency.

Since the desired response of this type of inertial sensor is centered at zero frequency, any nutation frequency motions are not only of no value, but may cause distortion, rectification, and other errors in the low frequency output measurements if not suitably damped. This damping is generally carried out by a combination of mechanical and control system (instrument capture loop or gimbal servo) design methods.

While this type of mechanization of inertial sensor has proven to be useful for a wide variety of applications, certain fundamental performance limitations exist. These include the common inertial sensor sensitivities to acceleration induced error torques (in association with mass unbalance and anisoelasticity conditions) and other low frequency error torques, such as magnetic and windage induced torques, as well as a class of error torques which is primarily associated with tuned suspension system sensors, namely the twice spin frequency rectifications of both angular and translational input motions. This class of error torques is generally of sufficient magnitude to necessitate both the employment of more than one gimbal and associated torsion spring suspension element per instrument and the associated careful balancing and adjustment methods required to insure effective cancellation of the effects.

Because all of the above mechanizations of inertial sensors are limited to two axes of information (centered about zero frequency) a total of two such sensors are required to provide all three axes of angular rate information. In addition, either two or three separate accelerometers are required for most inertial system requirements. Alternatively, three, two-axis gyro sensors, at least two of which are pendulous (built with a specific mass unbalance along the rotation axis) are required to supply sufficient information from which can be derived all three axes of angular rate and linear acceleration.

Another mechanization of the mechanically tuned suspension system exists in which the two natural frequencies of the instrument are adjusted to slightly greater than zero and (ideally) to precisely twice the rotation frequency. By a proper selection of the mechanical parameters of the instrument, including unequal moments of inertia of the rotor about the two principal axes orthogonal to the rotation axis, the response of the instrument centered at twice the rotation frequency is ideally a function of low frequency angular rate inputs only and is not a function of the usually troublesome low frequency torques. However, such a mechanization is sensitive to twice spin frequency angular rate and linear vibrational input rectification. This sensitivity has been the fundamental limitation to the practical exploitation of this gyro concept, in as much as the means for cancellation of these effects which are used for the more conventional mechanization, described previously, do not apply here.

BRIEF SUMMARY OF THE INVENTION

Spin coupled angular rate sensitive inertial sensors of the tuned suspension system type, and method of fabricating such sensors whereby the twice spin frequency linear and angular vibration sensitivity characteristic of tuned sensors may be eliminated. The elimination of this sensitivity allows the implementation of such devices so as to generate useful signals at the twice spin frequency, as measured with respect to a case fixed coordinate system. By making the rotor pendulous and by utilizing the signals centered around both zero frequency and twice spin frequency, sensors for providing two axis angular rate information and two axis acceleration information may be fabricated.

The twice spin frequency angular vibration sensitivity characteristic of other tuned inertial sensors is eliminated by creating an equal and opposite torque component, dependent on the same vibrational input. This is done by angularly offsetting the rotor suspension system from a plane orthogonal to the spin axis, and by providing the shaft assembly with an effective product of inertia of controlled magnitude and orientation. The product of inertia modules any twice spin frequency angular vibration of the shaft about an axis orthogonal to the spin axis with the spin frequency of the shaft to provide an angular disturbance of the shaft about the spin axis. This angular disturbance in combination with the inclination of the rotor suspension system causes the compensating twice spin frequency torque component on the rotor, which may be controlled as appropriate by adjusting the magnitude and position of the product of inertia on the shaft. The dynamic balance of the shaft may be maintained inspite of the presence of the product of inertia by coupling an equal and opposite product of inertia to the shaft so as to allow spring restrained angular rotation thereof about the spin axis. This balancing inertia may also be used to absorb spin speed angular disturbances of the shaft caused by other sources by tuning the balancing inertia-torsion spring combination to a natural frequency equal to the spin speed.

Similar compensating effects for twice spin frequency linear vibration may be achieved by an appropriate effective radial unbalance of the shaft assembly, with the unbalance being compensated for by a matching spring supported matching unbalance. Various forms of implementation of the invention are disclosed, and control of the zero frequency or twice spin frequency torques on the rotor may be contolled by the methods disclosed.

DETAILED DESCRIPTION OF THE INVENTION

According to the present invention, a new technique has been discovered which offers some unique advantages in the optimum implementation of rotating, mechanically tuned inertial sensors. This technique, which is termed "spin coupling", makes possible the effective elimination of the sensitivity of any of the mechanically tuned sensor mechanizations to twice spin frequency inputs.

The spin coupling technique basically employes a non-orthogonal suspension coupling of the rotor to the shaft in combination with a specific effective product of inertia and radial mass unbalance of the rigid body assembly associated with the shaft. The product of inertia and radial mass unbalance couples rate and translational motion, respectively, of the shaft about axes normal to the shaft, to the shaft axis. The northogonal suspension, in turn, couples the motion about the shaft axis to the rotor about axes perpendicular to the shaft axis. Thus, by this combination, additional components of sensitivity of the sensor rotor to twice spin frequency angular rate and translational motion inputs are produced, respectively, which can effectively cancel the inherent instrument sensitivities to these effects. These additional sensitivities are easily adjustable by adjusting balance weights on the rotating shaft assembly, and are non-critical and stable.

The product of inertia and mass unbalance of the rigid body shaft assembly previously mentioned constitutes a potential dynamic unbalance of the entire rotating system. In order to maintain the dynamic unbalance experienced by the spin bearings at null and retain the desired effect, an auxiliary inertia-spring element is coupled to this rotating rigid body in such a way as to have a product of inertia (and unbalance) with respect to the spin axis which is the negative of the product of inertia and unbalance which represents the dynamic unbalance of the rotating rigid body.

In order to prevent direct disturbances of the shaft about the spin axis from such sources as spin bearing noise or drive motor disturbances from similarly coupling into the rotor, the spring element may be selected to yield a resonant frequency about the spin axis of the inertia-spring combination equal to the spin speed to provide inertial damping of these disturbances.

The ability of the present invention to minimize twice spin frequency disturbances of the rotor allows the use of the twice spin frequency motion of the rotor to derive useful signal outputs. Thus, in the preferred embodiment of the present invention, an inertial sensor employing one of the basic mechanizations previously mentioned is utilized. This basic mechanization employs a nonsymmetric rotor, with one of the natural frequencies being twice the spin frequency and the other natural frequency being located slightly above zero frequency. The response of this type of sensor centered about zero frequency is directly related to the angular rates about the two input axes. In addition, this response is also sensitive to mass unbalance torques, anisoelasticity related torques and other low frequency error torques (such as magnetic and windage torques), as well as twice spin frequency angular rate and linear vibrational input rectification torques. The response of this type of sensor centered at twice spin frequency is again directly related to the angular rates about the two input axes. It is also dependent upon twice spin frequency linear and angular vibrational inputs, and is further dependent on any twice spin frequency components in the so called low frequency error torques, which are normally very low. In the preferred embodiment, it is the control of the twice spin frequency response to the twice spin frequency vibrational inputs (linear and angular) to which the present invention is applied.

By making use of the inherent high torquing rate capability of typical strapdown type sensor designs, it is possible to build into such a sensor a sufficiently high spin axis pendulosity such that, for all practical purposes, the instrument is sensitive only to the sum of angular rate inputs and linear acceleration inputs. Since the angular rate inputs are measured separately in the twice spin frequency band output, it is possible to subtract these angular rate measurements from this sum in order to obtain the acceleration measurements as separate measurements.

In the preferred embodiment of the present invention, the tuned rotary suspension includes an arrangement which has specific spring rates about two orthogonal axes, the plane defined by these axes being oriented at a relatively small but specific angle away from the plane which is normal to the spin axis. The inertia supported by these springs is designed to have unequal moments of inertia about two orthogonal axes normal to the spin axis. There are two general design approaches here. The first approach is to use a nearly symmetrical spring support coupled directly to the nonsymmetric inertia; the second approach is to use an intermediate gimbal and specific spring constants for the two flexure support axes. The latter approach would appear to have certain advantages in terms of tuning flexibility and translational stiffness, and therefore is utilized in the preferred embodiment.

The overall system is designed so that the resonant frequency determined principally by the nonsymmetric inertia and the support spring rate is coincident with twice the spin frequency, as previously mentioned, with the second resonant frequency being set as low as possible to maximize the zero frequency deflection for zero frequency torques (e.g., to best approach a "free rotor" condition).

In this manner the sensor can be made to respond only to angular rates at the twice spin speed resonance, and will respond to the sum of angular rates, error torques, and acceleration induced torques at low frequencies. The angular offset of the suspension system and the effective product of inertia and radial unbalance of the spinning rigid body to which the suspension is attached is adjusted to ideally provide a twice spin speed torque insensitivity to twice spin frequency linear and angular motions, induced principally by the spin bearings.

In the description to follow the structure and parameters of the foregoing embodiment are first described in detail; thereafter exemplary additional embodiments are also described as an illustration of the general concepts and applications of the invention. It is to be understood, however, that all of these specific embodiments are by way of example only, as the principles are generally applicable to any rotating tuned sensor configuration which may encounter objectional twice spin frequency sensitivities.

Figure 1:
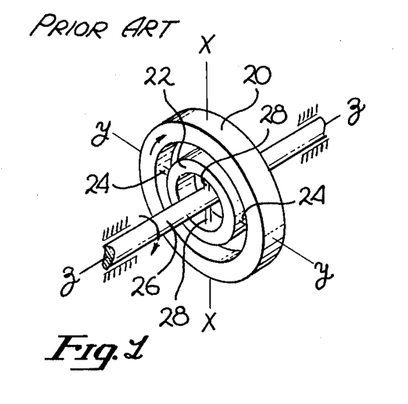
FIG. 1 is a perspective representation of a specific form of prior art tuned rotor suspension system.

First referring to FIG. 1, a perspective illustration of one prior art rotor suspension system may be seen. This system is that of E.W. Howe, described in detail in his prior patents and publications hereinbefore identified. The system is comprised of a rotor 20 supported from a gimbal 22 by a pair of torsion spring members 24 so as to allow relative spring restrained rotation between the rotor 20 and the gimbal 22 along the y axis. The gimbal 22 in turn is supported on a shaft 26 by a pair of torsion springs 28 so as to allow relative spring restrained angular rotation therebetween along the x axis. (The x and y axes representing a rotor fixed rotating coordinate system.) By the proper selection of the torsion bar spring rates and suitable adjustment of the inertias of the gimbal, the dynamics of the system will cancel the spring rate of the suspension system, so that the rotor will behave as a free rotor. The problem with this type of instrument however, is that the suspension system is sensitive to twice spin frequency angular vibrations having components about any case fixed axis orthogonal to the spin axis. These sensitivities, coupled with the normally experienced twice spin frequency angular vibration of the shaft caused by the spin bearings (and the variations thereof caused by environmental effects, etc.) prevent the direct application of this configuration to navigational grade instruments.

Figure 2:
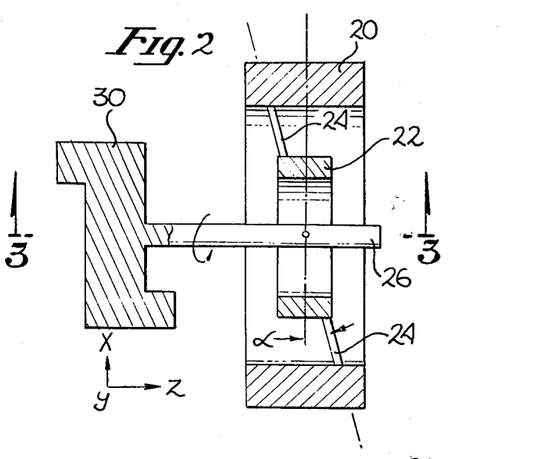
FIG. 2 is a cross-sectional representation of a suspension system similar to FIG. 1 incorporating the present invention.
Figure 3:
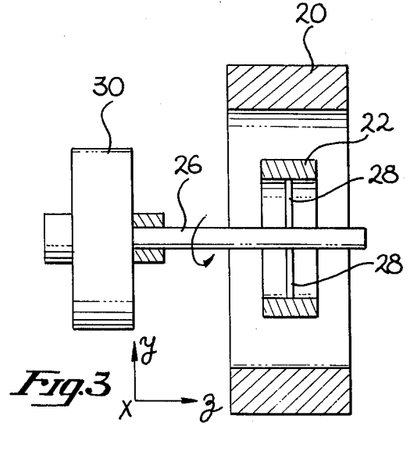
FIG. 3 is a cross-sectional representation of the system of FIG. 2 taken along line 3-3 thereof.

Now referring to FIGS. 2 and 3, schematic cross-sections of an instrument of the general type shown in FIG. 1, but incorporating the present invention, may be seen. Utilizing the general coordinate system of FIG. 1, FIG. 2 will represent a cross-section in the $x z$ plane. As before, the gimbal 22 is supported on the shaft by a pair of inner torsion springs 28, with the rotor being supported from the gimbal 22 by a pair of outer torsion springs 24, generally orthogonal to the inner springs 28. However, it will be noted that the axis of the outer torsion springs 24 is angularly offset in the $y z$ plane by an angle alpha ($\alpha$) from the $y$ axis of the rotor. It will be noted also that a member 30 having a substantial product of inertia with respect to the $y z$ axes is directly coupled to the shaft 26.

By selecting the magnitude of the product of inertia, hereinafter referred to as $D_S$, in conjunction with the angle $\alpha$, the inherent twice spin frequency angular vibration sensitivity of the prior art configuration of FIG. 1 may be effectively cancelled. In particular, the twice span frequency angular vibration of the shaft about any axis orthogonal to the spin axis is modulated by the product of inertia coupled to the spin axis (and rotating at spin speed) to provide an angular vibration of the shaft about the spin axis (superimposed on the constant spin speed component of the shaft assembly). This spin frequency angular disturbance of the shaft in combination with the nonorthogonal coupling of the shaft to the rotor (e.g., as a result of the offset angle $\alpha$) couples a torque component to the rotor not only about the spin axis, but also about the rotor fixed $y$ axis. In terms of a case fixed coordinate system, this component of torque on the rotor may be represented by the sum of a zero frequency torque and a twice spin frequency torque. Since the magnitude and case fixed orientation of these torques for a given twice spin frequency angular vibration input will depend upon not only the angle alpha ($\alpha$) and the magnitude of the product of inertia, but also on the angular orientation of the product of inertia with respect to the inclined suspension axis, one can control both the twice spin frequency angular vibration induced zero frequency torque on the rotor, and the twice spin frequency angular vibration induced twice spin frequency torque on the rotor (but not both torques independently). It should be noted here, that while the specific configuration shown in FIGS. 2 an 3 creates an undesired dynamic unbalance to the rotating assembly, a technique for eliminating this dynamic unbalance while still retaining the same effective result is later described in detail herein.

The ability to control twice spin frequency angular vibration induced torques on the rotor may be utilized in a number of ways. The most obvious application of this technique is with respect to the general class of instruments utilizing a suspension system similar to that of FIG. 1. By a proper selection and adjustment of the parameters, the inherent twice spin frequency angular vibration sensitivity of the tuned free rotor of E. W. Howe may be eliminated in a simple and straightforward way. Accordingly, the more complicated suspension systems such as those of U.S. Pat. Nos. 3,678,764 and 3,832,906, and particularly the additional adjustments required on the tuned suspension system thereof, are not required when utilizing the present invention.

Since the present invention can be used to control the twice spin frequency torques on the rotor caused by twice spin frequency angular vibration of the shaft, the twice spin frequency response of the rotor may be utilized to derive useful output signals. In particular, in the preferred embodiment, the parameters are selected and adjustments made so that the twice spin frequency torque required to maintain the twice spin frequency vibration of the rotor at a null is used as a measure of the angular rate input to the instrument. Of course, two axis angular information may be derived in this manner.

To maximize the twice spin frequency response of the rotor to a twice spin frequency torque on the rotor, one of the rotor natural frequencies is adjusted to be equal to twice spin speed. This places the second natural frequency of the rotor at some value above zero frequency, dependent upon the rotor and gimbal configurations. To tune the rotor to twice spin frequency, the following tuning condition must be met:

$$\frac{K_i + K_o}{2} = n^2 \left[ 2(A+B-C) + \frac{1}{2}(A_1+B_1-C_1) + \frac{C(C_1+C_s)\tan^2\alpha}{2(C+C_1+C_s)} \right]$$

where $K_i$: is the torsional spring rate of the inner torsion springs coupling the gimbal to the shaft, $K_o$: is the torsional spring rate of the outer torsion springs coupling the gimbal to the rotor, $n$: is the spin frequency;

$A,B,C$: are the principal moments of inertia of the rotor about the $x$, $y$ and $z$ axes respectively, $A_1;B_1;C_1$: are the principal moments of inertia of the gimbal about the $x$, $y$ and $z$ axes respectively, $C_s$: is the polar moment of inertia of the shaft (not including the rotor assembly), and $\alpha$: is the angle inclination of the rotor suspension as shown in FIG. 2.

For an instrument adjusted in accordance with the foregoing equation, the twice spin speed angular vibration sensitivity of the twice spin speed response of the instrument is eliminated if the following condition is met:

$$\frac{D_s C \tan \alpha}{C+C_1+C_s} = A+B-C + \frac{A_1+B_1-C_1}{2}$$

where the parameters are as previously defined, and $D_s$: is the effective product of inertia of the shaft about the $y$ $z$ axes.

By satisfying the foregoing equation, any twice spin frequency angular vibration of the shaft about axes orthogonal to the spin axis will not result in any twice spin frequency torques on the rotor. Of course, since the twice spin frequency torque on the rotor caused by a constant (zero frequency) angular rate input to the instrument is proportional to the angular rate input times the spin speed times the difference in the inertias A and B; the difference in the moments of inertia of the rotor about the $x$ and $y$ axes should be maximized.

In a closed loop system, any disturbance of the rotor sensed by the pickoffs will be nulled by equal and opposite torques of the rotor applied by the torquers. Thus, regardless of the response of the rotor, a low frequency torque input to the rotor can only be balanced by a corresponding low frequency torque input. However, for pickoff signal separation purposes, it is desirable to have the open loop response of the rotor at twice spin frequency be independent of the DC and low frequency torques. This may be achieved if the following condition is met:

$$\frac{n^2}{2} \left[ A_1+B_1-C_1 - \frac{C(C_1+C_s)\tan^2\alpha}{C+C_1+C_s} \right] + \frac{K_o-K_i}{2} = 0$$

Thus, if the foregoing three equations are met and the magnitude of A—B is maximized, the twice spin frequency response of the rotor to constant and low frequency rate inputs is maximized, and the twice spin frequency response of the rotor to zero frequency torques such as windage, pendulosity, etc. and to twice spin frequency angular vibration is eliminated. Accordingly, highly accurate angular rate sensing may be readily achieved.

Though the instrument just described is not tuned to zero frequency (e.g., not tuned as a free rotor instrument) the effective spring restraint of the rotor is not high, so that by making the rotor pendulous by an amount which is substantially larger than the expected constant error torques such as windage, etc. the zero frequency (and low frequency) torque required to capture the rotor may be utilized as a measure of the acceleration being experienced by the instrument. The existence of such a pendulosity however, would make the instrument of FIGS. 2 and 3 sensitive to twice spin frequency linear vibration components along axes perpendicular to the spin axis. This sensitivity may be eliminated by a technique very similar to that hereinbefore described with respect to twice spin frequency angular vibrations. In particular, by appropriately radially unbalancing the shaft assembly about the spin axis, a twice spin frequency linear vibration will cause a corresponding angular vibration of the shaft about the spin axis, which in turn will cause a zero frequency and a twice spin frequency torque on the rotor, as before. Adjustment of the magnitude and location of the radial unbalance with respect to the inclination of the support system allows control either of the zero frequency or the twice spin frequency torque as desired (but again, not both independently). In the preferred embodiment, the location and the magnitude of the radial unbalance is adjusted so as to minimize the twice spin frequency torque on the rotor. Accordingly, if the following condition is met, the twice spin frequency angular vibration sensitivity of the twice spin frequency response of the rotor will be eliminated.

$$P = \frac{MR \tan \alpha}{2}$$

where

P: is the pendulosity of the rotor

MR: is the effective first moment or radial unbalance of the rotating shaft assembly.

Figure 4:
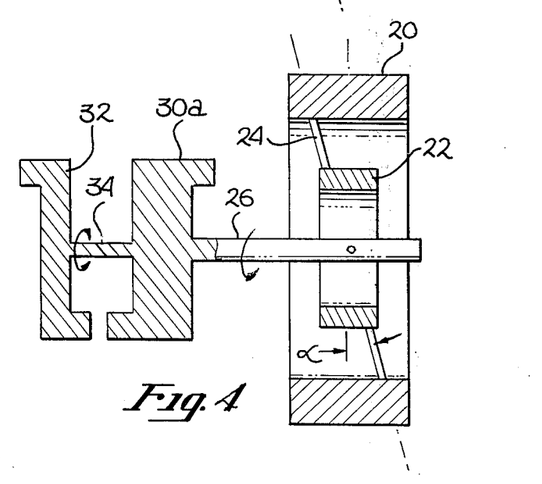
FIG. 4 is a cross-sectional representation of an alternate embodiment utilizing a balancing inertia coupled to the rotating shaft assembly through a torsional spring restraint.

Now referring to FIG. 4, the method of maintaining the dynamic balance of the rotating assembly will be described. This figure is similar to FIG. 2, but includes a balancing inertia 32 coupled to the shaft assembly through a torsion spring 34, thereby allowing relative rotation therebetween. If the balancing inertia 32 has a product of inertia which is equal and opposite to the product of inertia of member 30a (representing the product of inertia of the rotating assembly rigidly coupled to the shaft) the rotating assembly will be dynamically balanced. However, the effect of the product of inertia on the shaft assembly will still be retained if the spring rate of the torsion spring 34 is relatively low, as the response of the balance inertia 32 to twice spin frequency angular vibration input will not be significantly coupled to the shaft assembly.

It should be noted that any spin speed disturbance of the shaft about the spin axis will be coupled to the rotor by way of zero frequency and twice spin frequency torques, so that unless special provisions are made, such disturbances caused by the spin bearings, motor and other sources will result in large and relatively erratic disturbing torques on the rotor. However, if the combination of the torsional spring rate of torsion spring 34 and the moment of inertia of the balancing inertia 32 about the spin axis are chosen so as to have a natural frequency equal to the spin frequency, the balancing inertia 32 will act as a vibration absorber with respect to any spin frequency disturbances of the shaft about the spin axis. While the balancing inertia 32 will also absorb the compensating torques on the shaft caused by the product of inertia of member 38 coupled directly to the shaft, the spin speed torques of the balancing inertia 32 caused by its product of inertia will be coupled directly to the shaft through the torsion spring 34. Accordingly, when using the balancing inertia 32 as shown in FIG. 4, the effective product of inertia coupled to the shaft assembly is the product of inertia of the balancing inertia 32 rather than the product of inertia of member 30a.

Figures 5, 6:
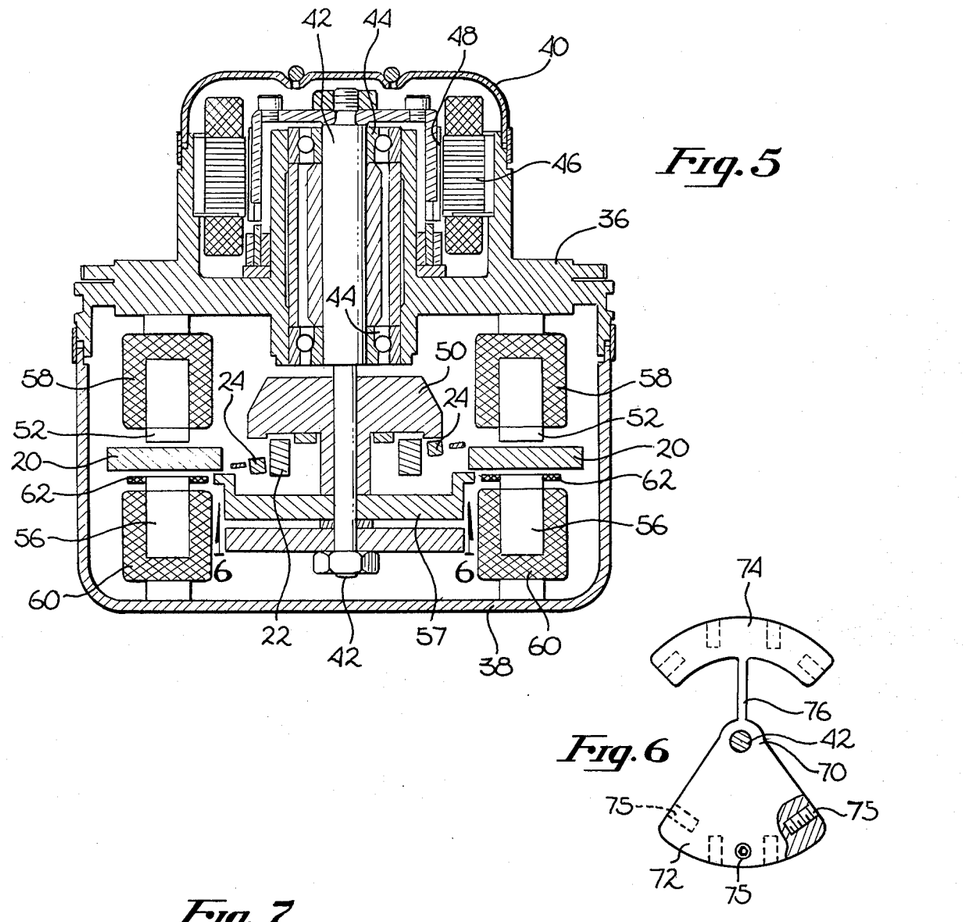
FIG. 5 is a cross-section of an instrument fabricated in accordance with the combination of FIG. 4.
FIG. 6 is an end-view of the balancing inertia on the instrument of FIG. 5, taken along line 6—6 of that figure.

Now referring to FIGS. 5 and 6, two views of a practical embodiment of the present invention in accordance with the foregoing description may be seen. FIG. 5 is a cross-section of the complete instrument, and FIG. 6 is a view taken along line 6—6 of FIG. 5. The instrument is contained within a housing 36 and enclosed by top and bottom covers 38 and 40. The shaft 42 is supported on spin bearings 44 and driven in rotation by a conventional synchronous motor comprised of a stator 46 and a hysteresis rotor 48. A flexure pivot support member 50 supports a first pair of cross strap flexures coupled to the gimbal 22, with a second pair of flexures 24 coupling the gimbal to the rotor 20. (Reference is hereby made to U.S. Pat. No. 3,832,906 for further details of such cross strap flexure support of gimbals and rotors as is known in the prior art.) The rotor travel is limited by a stop 57 on the rotating assembly so that the rotor cannot deflect to strike the pickoff cores 52 and the torquer cores 56. Four pickoff assemblies, two on each of the axes, comprised of pickoff cores 52 and coils 58 are used. Similarly, two axes torquing is provided by four torquer cores 56 and drive coils 60 (two on each axis).

Because of the desired flat construction of the rotor 20, the simplicity of the design, and the need for a wide dynamic range torquing system, an electromagnetic torquer is employed operating at a fixed frequency. The cores and the rotor are all made up of ferro magnetic materials so that the magnetic flux return path for both the torquer and pickoff magnetic circuits is through the rotor 20. (The rotor is preferably uniform in geometry, with $|A-B|$ being maximized by alternate quadrants having lighter and heavier materials.)

A sensing coil 62 is used on each pole (two poles per torquer core) of each torquer core to obtain an accurate measure of the magnitude of the alternating magnetic flux in the air gap, independent of torquer core mechanical creep and rotor angular position. Since the magnitude of the torque is proportional to the square of the magnitude of the flux, the output voltage of the sensing coils 62 is sampled at a high frequency and converted to a digital measure similar to precision inertial analog to digital converter systems currently in use by the assignee of the present invention.

The torquing system employed here has certain important advantages over a permanent magnet type torquer. These include the elimination of a precision scaling resistor to convert from an electrical current to a voltage, an almost two orders of magnitude reduction in torquer scale factor temperature sensitivity, and the elimination of the need for scale switching in the output circuitry and analog to digital convertor. The pickoffs and torquers operate at widely different frequencies and are further isolated from one another by the shielding effect of the rotor.

The means for providing the effective radial unbalance on the shaft assembly as well as the effective product of inertia may be seen in FIG. 6. A member 70 is supported on shaft 42 adjacent the rotating stop 57. This member has a first rigid protrusion 72 extending radially from the shaft 42 and a second diametrically opposed element 74 coupled to the hub of member 70 by a relatively thin flat spring member 76. The member 72 provides both the radial unbalance and the product of inertia coupled directly to the shaft in accordance with the preceding description, with member 74 comprising the spring mounted counterbalancing product of inertia and counterbalance means to dynamically balance the shaft assembly. By proper selection of the coupling spring member 76, the desired tuning of the spring mounted member 74 to spin frequency may be achieved (adjusting screws allowing the adjustment of the product of inertia and the radial unbalance, as well as for dynamically balancing the system, are generally indicated by the numeral 75.

Figure 7:
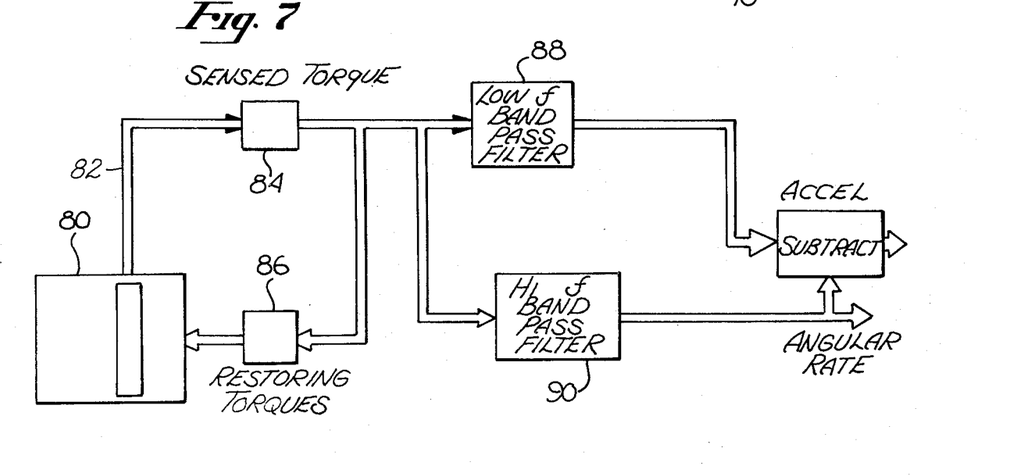
FIG. 7 is a block diagram of a signal processing and restoring torque system for the embodiment of FIG. 5.

A block diagram of the closed loop system may be seen in FIG. 7. The instrument, generally indicated by the numeral 80, provides relatively broad band two axis rotor angle output information on lines 82, which is conditioned by circuits 84 and 86 in a conventional manner for applying restoring torques to the torquers to maintain the rotor in a null position. (In the preferred embodiment the torquers are AC torquers operating at four times the spin frequency.) The output of the electronics 84 is also applied to low pass filters 88 and band pass filters 90. The output of the band pass filters 90, e.g., centered at a frequency equal to twice spin frequency, is a direct measure of the angular rates being applied to the instrument (two axis information being derived). The output of the low pass filter 88 is a combination of the angular rate and the acceleration, and accordingly the output of the band pass filter 90 may also be subtracted from the output of the low pass filter 88 to provide output signals proportional only to the accelerations being experienced by the instrument.

It will be noted that the rotor of the previously described system is supported with two axis angular freedom with respect to the shaft with only relatively low spring restraint on each axis. Accordingly, the rotor will tend to spin about a principal axis, and will tend to align itself with the spin axis of the shaft. Therefore the inclination of the suspension system by the angle $\alpha$ may be considered to be with respect to a plane orthogonal to the spin axis, or with respect to the plane containing two of the principal axis of the rotor. On the other hand, it is not a design restraint that the rotor be driven about a principal axis, and in general the desired effect of the inclination will be achieved if the inclination is referenced to either the plane orthogonal to the spin axis, or with respect to two of the principal axes of the rotor.

The general principals of the present invention are not limited only to tuned sensors of the type utilizing an intermediate gimbal. By way of specific example, the foregoing equations apply to a gimbal-less spring supported rotor by merely using a zero value for the gimbal inertias in the applicable equations. Thus the foregoing three principal equations for such a configuration reduce to the following:

$$\frac{K_i + K_n}{2} = n^2 \left[ 2(A+B-C) + \frac{CC_s \tan^2\alpha}{2(C+C_s)} \right]$$

$$A+B-C = \frac{D_s C \tan\alpha}{C+C_s}$$

$$K_n - K_i = \frac{n^2 C_s \tan^2\alpha}{C+C_s}$$

Figure 8:
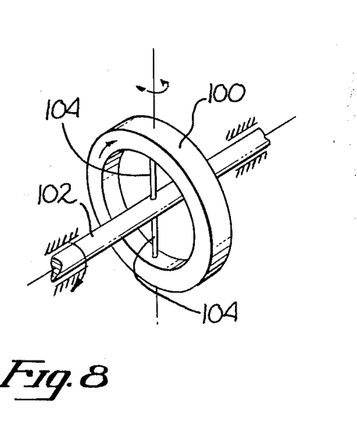
FIG. 8 is a perspective schematic representation of another prior art suspension system.
Figure 9:
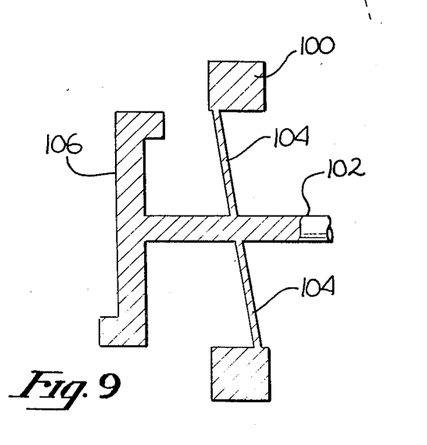
FIG. 9 is a schematic cross-section illustrating the implementation of the present invention with the basic suspension system of FIG. 8.

Further, the principles of the present invention are not limited merely to tuned sensors wherein the rotor is provided with two degrees of freedom with respect to the shaft. By way of specific example, a prior art sensor utilizing a single degree of freedom of the rotor with respect to the shaft is shown in FIG. 8. This type of sensor utilizes a rotor 100 supported on a shaft assembly 102 by a torsion bar 104 so as to be torsion spring restrained about a single rotor fixed axis with respect to the shaft. Such a sensor as is known in the prior art is adjusted so that the single resonant frequency is equal to twice spin frequency, so that angular rate inputs disturb the rotor at its natural frequency. In theory such a sensor avoids disturbances caused by the common zero frequency error torques, but in practice is plagued by a high sensitivity to twice spin frequency angular vibration of the shaft. However, by inclining the torsion bar 104 as shown in FIG. 9 and also providing a product of inertia 106 on the rotating shaft assembly, the sensitivity to twice spin frequency angular vibration of the shaft may be eliminated and extremely accurate two axis angular rate measurements may be obtained.

The concepts of the present invention have been verified experimentally in a single gimbal suspension device utilizing an angle of inclination of the rotor suspension alpha ($\alpha$) equal to four degrees. Of course there is nothing critical with respect to this specific angle, though it is expected that most designs will utilize an angle ranging from a substantial fraction of one degree to approximately five degrees. It is to be understood, however, that substantially any angle, particularly larger angles, may readily be used as desired, depending upon the characteristics of the particular design.

Also, it should be noted that the phrase "torsion springs" (and equivalent terminology) is used herein to identify various forms of suspension means that may be utilized in a tuned sensor. It is to be understood that such terminology is used in the most general sense to identify a suspension means or coupling element having as its most predominant compliance a torsional spring-rate about the specifically identified axis (or axes). While perfect rigidity in other modes cannot be achieved, and for that matter may not be desired, typically compliances in other modes of rotation and translation are preferably minimal. (A gimbal-less tuned sensor having two rotor-fixed axes of angular freedom being the exception to this statement; e.g., having substantial compliance about all axes falling in the plane of the suspension system.) The suspension means elements of U.S. Pat. Nos. 3,678,764; 3,832,906; 3,301,073; 3,543,301; and 3,354,726 are but a few examples of such suspension means.

There has been described herein apparatus and methods for eliminating the twice spin frequency vibration sensitivities characteristic of an entire class of prior art tuned inertial sensors. In addition, a specific embodiment of the present invention has been described in detail whereby a single sensor may be fabricated so as to provide two axis angular rate and two axis acceleration information. Of course, signal processing or other forms of torquing may provide signals in other forms, such as by way of example, information with respect to angular orientation and velocities, rather than rates and accelerations. Similarly, any alternate designs for suspension systems, pickoffs, and the like, may readily be combined with the present invention. Also, control of either the twice spin frequency response or the zero frequency response of any particular sensor may be achieved as desired. Thus, while the invention has been disclosed and described with respect to certain specific embodiments and purposes thereof, it will be understood by those skilled in the art that various changes in form, detail and implementation may be made therein without departing from the spirit and scope of the invention.

I claim:

1. Apparatus in a tuned inertial instrument for minimizing the effects of twice spin frequency angular disturbances of the shaft about axes which are orthogonal to the spin axis comprising:
   a shaft means for rotation about a spin axis at a predetermined spin frequency;
   a sensitive element;
   a suspension means for coupling said sensitive element to said shaft, said suspension means including means for allowing relative oscillation between said sensitive element and said shaft about at least one suspension means axis, said suspension means axis being non-orthogonally disposed with respect to said spin axis by a predetermined angle; and
   means coupled to said shaft for providing a product of inertia about said spin axis and an axis perpendicular to said spin axis.

2. The apparatus of claim 1 wherein said means coupled to said shaft means for providing a product of inertia is a means fastened to said shaft means.

3. The apparatus of claim 2 wherein said means coupled to said shaft means for providing a product of inertia is an adjustable means whereby the magnitude and the angular orientation of said product of inertia may be adjusted.

4. The apparatus of claim 1 wherein said means coupled to said shaft means for providing a product of inertia is a means fastened to said shaft means, and further comprising a balancing inertia means coupled to said shaft means through a coupling means having a predetermined spring rate about an axis substantially parallel to said spin axis, said balancing inertia means having a product of inertia substantially equal to and opposite said product of inertia of said means coupled to said shaft for providing a product of inertia.

5. The apparatus of claim 4 wherein the magnitude and angular position of the product of inertia of said balancing inertia means and said means coupled to said shaft means are adjustable.

6. The apparatus of claim 4 wherein the natural frequency of said balancing inertia means, as determined by said predetermined spring rate about an axis substantially parallel to said spin axis and the inertia of said balancing inertia about said axis substantially parallel to said spin axis, is tuned to be substantially equal to the spin frequency.

7. The apparatus of claim 1 wherein said sensitive element has at least one principal axis fixed with respect to said sensitive element, said at least one principal axis being disposed substantially coaxial with said spin axis.

8. The apparatus of claim 1 wherein said sensitive element comprises a rotor means, and said suspension means comprises a torsion spring means for coupling said rotor means to said shaft means with a predetermined torsional spring rate about said suspension means axis.

9. The apparatus of claim 1 wherein said suspension means comprises at least one intermediate gimbal, and first and second gimbal torsion spring means for each said intermediate gimbal, said first gimbal torsion spring means being a means for coupling a respective said intermediate gimbal to said shaft means with a predetermined torsional spring rate about a first gimbal torsion spring axis, said second gimbal torsion spring means being a means for coupling a respective intermediate gimbal to said sensitive element with a predetermined torsional spring rate about a second gimbal torsion spring axis.

10. The apparatus of claim 9 wherein said second gimbal torsion spring axis constitutes said suspension means axis.

11. The apparatus of claim 9 wherein said first and second gimbal torsion spring axes are substantially orthogonal and one of said first and second gimbal torsion spring axes is substantially orthogonal to said spin axis.

12. The apparatus of claim 9 wherein said suspension means comprises only one intermediate gimbal and first and second gimbal torsion means for said intermediate gimbal.

13. An apparatus in a tuned inertial instrument for minimizing the effects of twice spin frequency angular disturbances of the shaft about axes which are orthogonal to the spin axis comprising:
a shaft means for rotation about a spin axis at a predetermined spin frequency;
a sensitive element having at least one sensitive element principal axis fixed with respect to said sensitive element;
a suspension means for coupling said sensitive element to said shaft, said suspension means including means for allowing relative oscillation between said sensitive element and said shaft about at least one suspension means axis, said suspension means axis being nonorthogonally disposed with respect to said sensitive element principal axis by a predetermined angle; and
means coupled to said shaft for providing a product of inertia about said spin axis and an axis perpendicular to said spin axis.

14. The apparatus of claim 13 wherein said means coupled to said shaft means for providing a product of inertia is a means fastened to said shaft means.

15. The apparatus of claim 14 wherein said means coupled to said shaft means for providing a product of inertia is an adjustable means whereby the magnitude and the angular orientation of said product of inertia may be adjusted.

16. The apparatus of claim 13 wherein said means coupled to said shaft means for providing a product of inertia is a means fastened to said shaft means, and further comprising a balancing inertia means coupled to said shaft means through a coupling means having a predetermined spring rate about an axis substantially parallel to said spin axis, said balancing inertia means having a product of inertia for dynamically balancing the rotating assembly.

17. The apparatus of claim 16 wherein the magnitude and angular position of the product of inertia of said balancing inertia means and said means coupled to said shaft means are adjustable.

18. The apparatus of claim 16 wherein the natural frequency of said balancing inertia means, as determined by said predetermined spring rate about said axis substantially parallel to said spin axis and the inertia of said balancing inertia about said axis substantially parallel to said spin axis, is tuned to be substantially equal to the spin frequency.

19. The apparatus of claim 13 wherein said one sensitive element principal axis fixed with respect to said sensitive element is disposed substantially coaxial with said spin axis.

20. The apparatus of claim 13 wherein said sensitive element comprises a rotor means, and said suspension means comprises a torsion spring means for coupling said rotor means to said shaft means with a predetermined torsional spring rate about said suspension means axis.

21. The apparatus of claim 13 wherein said suspension means comprises at least one intermediate gimbal, and first and second gimbal torsion spring means for each said intermediate gimbal, said first gimbal torsion spring means being a means for coupling a respective said intermediate gimbal to said shaft means with a predetermined torsional spring rate about a first gimbal torsion spring axis, said second gimbal torsion spring means being a means for coupling a respective intermediate gimbal to said sensitive element with a predetermined torsional spring rate about a second gimbal torsion spring axis.

22. The apparatus of claim 21 wherein said second gimbal torsion spring axis constitutes said suspension means axis.

23. The apparatus of claim 21 wherein said first and second gimbal torsion spring axes are substantially orthogonal and one of said first and second gimbal torsion spring axes is substantially orthogonal to said spin axis.

24. The apparatus of claim 21 wherein said suspension means comprises only one intermediate gimbal and first and second gimbal torsion spring means for said intermediate gimbal.

25. A method of controlling the effects of twice spin frequency angular disturbances of the shaft of a tuned inertial instrument about axes which are orthogonal to the spin axis, the tuned inertial instrument being of the type having a shaft, a sensitive element and a suspension system for coupling the sensitive element to the shaft so as to allow relative oscillation between the sensitive element and the shaft about at least one suspension axis, the method comprising the steps of:
  a. nonorthogonally disposing at least one suspension axis with respect to the spin axis by a predetermined angle;
  b. providing a product of inertia on the shaft;
  c. adjusting the product of inertia to control the response of the instrument to twice spin frequency angular vibration.

26. The method claim 25 further comprised of the step of providing a twice spin frequency angular vibration of the inertial instrument to determine its sensitivity thereto, and wherein step (c) comprises adjusting the magnitude and angular orientation of the product of inertia with respect to a suspension axis.

27. The method of claim 26 further comprised of the steps of:
  a. coupling a balancing inertia to the shaft with a torsion spring support having a torsion spring axis substantially parallel to the shaft axis; and
  b. adjusting the magnitude and location of the product of inertia of the balancing inertia to dynamically balance the rotating assembly.

28. The method of claim 27 wherein the natural frequency of the balancing inertia about the torsion spring axis, as determined by the spring support and the respective inertia of the balancing inertia, is made substantially equal to the spin frequency.

29. A method of controlling the effects of twice spin frequency angular disturbances of the shaft of a tuned inertial instrument about axes which are orthogonal to the spin axis, the tuned inertial instrument being of the type having a shaft, a sensitive element having at least one principal axis fixed with respect thereto, and a suspension system for coupling the sensitive element to the shaft so as to allow relative oscillation between the sensitive element and the shaft about at least one suspension axis, the method comprising the steps of:
  a. nonorthogonally disposing at least one suspension axis with respect to the principal axis by a predetermined angle;
  b. providing a product of inertia on the shaft;
  c. adjusting the product of inertia to control the response of the instrument when subjected to twice spin frequency angular vibration.

30. The method of claim 29 further comprised of the step of providing a twice spin frequency angular vibration of the inertial instrument to determine its sensitivity thereto, and wherein step (c) comprises adjusting the magnitude and angular orientation of the product of inertia with respect to a suspension axis.

31. The method of claim 30 further comprised of the steps of:
  a. coupling a balancing inertia to the shaft with a torsion spring support having a torsion spring axis substantially parallel to the shaft axis; and
  b. adjusting the magnitude and location of the product of inertia of the balancing inertia to dynamically balance the rotating assembly.

32. The method of claim 31 wherein the natural frequency of the balancing inertia about the torsion spring axis, as determined by the spring support and the respective inertia of the balancing inertia, is made substantially equal to the spin frequency.

33. An inertial instrument comprising:
  a shaft means for rotation about a spin axis at a predetermined spin frequency;
  a rotor having first, second and third orthogonal principal axes, said third principal axis being approximately aligned with said spin axis, said rotor having substantially different moments of inertia about said first and second principal axes;
  a suspension means for coupling said rotor to said shaft, said suspension means having first and second torsional spring rates about first and second suspension means axes respectively, at least one of said suspension means axes being non-orthogonally disposed with respect to said spin axis by a predetermined angle, said rotor having a predetermined pendulosity along said first principal axis with respect to the center of support of said suspension means; and
  inertia means fastened to said shaft for providing a product of inertia about said spin axis and an axis perpendicular to said pin axis.

34. The instrument of claim 33 further comprised of a means for dynamically balancing the rotating assembly.

35. The instrument of claim 33 wherein said first and second suspension means axes are substantially orthogonal axes, and said first suspension axis is substantially orthogonal to said spin axis and substantially aligned with one of said second and third principal axes of said rotor, said instrument being adjusted so that the following equations are effectively satisfied:

$$\frac{K_1 + K_2}{2} = N^2 \left[ 2(A+B-C) + \frac{CC_s \tan^2\alpha}{2(C+C_s)} \right]$$

$$\frac{K_1 - K_2}{2} = \frac{N^2 C_s \tan^2\alpha}{C+C_s}$$

$$A+B-C = \frac{D_s C \tan\alpha}{C+C_s}$$

where A, B and C are the moments of inertia of said rotor about said first, second and third principal axes, N is the spin frequency, and $K_1$ and $K_2$ are the torsional spring rates of said suspension means about said first and second suspension means axes respectively, $C_s$ is the moment of inertia of said shaft about said spin axis, $D_s$ is the product of inertia of said inertia means with respect to said spin axis and an axis in the plane of said spin axis and said second suspension means axis; and $\alpha$ is said predetermined angle for said second suspension means axis.

36. The instrument of claim 35 wherein said means for dynamically balancing the rotating assembly comprises a balancing inertia means having a product of inertia selected to make the net product of inertia of the rotating assembly substantially equal to zero, said means for dynamically balancing the rotating assembly being coupled to said shaft means through a torsional spring having a torsion axis substantially parallel with said spin axis so as to provide a resonant frequency with respect to said shaft means about said torsion axis substantially equal to the spin speed.

37. The inertial instrument of claim 35 further comprised of sensing means and torquing means, said sensing means being a means for providing sensing means signals responsive to changes in angular orientation between said third principal axis of said rotor and said spin axis, and said torquing means being a means for torquing said rotor in response to said sensing means signals.

38. The inertial instrument of claim 37 further comprised of signal separation means, said torquing means being a means for torquing said rotor about first and second torquer axes substantially mutual orthogonal and orthogonal to said spin axis, said torquing means being responsive to said sensing means signals to maintain said signals at a null, said signal separation means being a means for providing first and second gyro output signals responsive to case fixed twice spin frequency torques of said torquing means about said first and second torquing means axes, and for providing first and second accelerometer output signals responsive to a weighted combination of case fixed twice spin frequency torques and case fixed zero frequency torques about said first and second torquer axes.

39. An inertial instrument comprising:
   a shaft means for rotation about a spin axis at a predetermined spin frequency;
   a rotor having first, second and third orthogonal principal axes; said third principal axis being generally aligned with said spin axis, said rotor having substantially different moments of inertia about said first and second principal axes;
   a gimbal
   a first torsion spring means for coupling said gimbal to said shaft means, said first torsion spring means being a means for providing a first torsional spring rate about a first torsion spring axis generally orthogonal to said spring axis and generally aligned with said first principal axis of said rotor;
   a second torsion spring means for coupling said gimbal to said rotor, said second torsion spring means being a means for providing a second torsional spring rate about a second torsion spring axis generally orthogonal to said first torsion spring axis and inclined by a predetermined angle from said second principal axis of said rotor and in the plane of said second principal axis and said spin axis, said rotor having a predetermined pendulosity along said first principal axis with respect to the center of support of said rotor; and
   inertia means fastened to said shaft for providing a product of inertia about said spin axis and an axis in the plane of said spin axis and said second principal axis.

40. The instrument of claim 39 further comprised of a means for dynamically balancing the rotating assembly.

41. The instrument of claim 39 wherein said instrument is adjusted so that the following equations are effectively satisfied:

$$\frac{K_1+K_2}{2} = N^2\left[2(A+B-C) + \frac{1}{2}(A_1+B_1-C_1) + \frac{C(C_1+C_s)\tan^2\alpha}{2(C+C_1+C_s)}\right]$$

$$\frac{N^2}{2}\left[A_1+B_1-C_1 - \frac{C(C_1+C_s)\tan^2\alpha}{C+C_1+C_s}\right] + \frac{K_2-K_1}{2} = 0$$

$$\frac{D_sC\tan\alpha}{C+C_1+C_s} = A+B-C + \frac{A_1+B_1-C_1}{2}$$

where A, B, and C are the moments of inertia of said rotor about said first, second and third principal axes, $A_1$, $B_1$, and $C_1$ are the moments of inertia of said gimbal about axes substantially parallel to said first, second and third principal axes of said rotor, respectively, N is the spin frequency, $K_1$ and $K_2$ are said first and second torsional spring rates respectively, $C_s$ is the moment of inertia of said shaft about said spin axis, $D_s$ is the magnitude product of said product of inertia of said inertia means and $\alpha$ is said predetermined angle for said second suspension means axis.

42. The instrument of claim 41 wherein said means for dynamically balancing the rotating assembly comprises a balancing inertia means having a product of inertia selected to make the net product of inertia of the rotating assembly substantially equal to zero, said means for dynamically balancing the rotating assembly being coupled to said shaft through a torsional spring having a torsion axis substantially parallel to said spin axis so as to provide a resonant frequency with respect to said shaft about said spin axis substantially equal to the spin speed.

43. The inertial instrument of claim 41 further comprised of sensing means and torquing means, said sensing means being a means for providing sensing means signals responsive to changes in angular orientation between said third principal axis of said rotor and said spin axis, and said torquing means being a means for torquing said rotor in response to said sensing means signals.

44. The inertial instrument of claim 43 further comprised of signal separation means, said torquing means being a means for torquing said rotor about first and second torquer axes substantially mutually orthogonal and orthogonal to said spin axis, said torquing means being responsive to said sensing means signals to maintain said signals at a null, said signal separation means being a means for providing first and second gyro output signals responsive to case fixed twice spin frequency torques of said torquing means about said first and second torquing means axes, and for providing first and second accelerometer output signals responsive to a weighted combination of case fixed twice spin frequency torques and case fixed zero frequency torques about said first and second torquer axes.

45. Apparatus is a tuned inertial instrument for minimizing the effects of twice spin frequency linear disturbances of the shaft about axes which are orthogonal to the spin axis comprising:
   a shaft means for rotation about a spin axis at a predetermined spin frequency;
   a sensitive element;
   a suspension means for coupling said sensitive element to said shaft, said suspension means including means for allowing relative oscillation between said sensitive element and said shaft about at least one suspension means axis, said suspension means axis being non-orthogonally disposed with respect to said spin axis by a predetermined angle; and
   means fastened to said shaft for providing a unbalance of said shaft about said spin axis.

46. The apparatus of claim 45 further comprising a balancing means coupled to said shaft means through a spring coupling.

47. The apparatus of claim 45 wherein said suspension means comprises at least one intermediate gimbal, and first and second gimbal torsion spring means for each said intermediate gimbal, said first gimbal torsion spring means being a means for coupling a respective said intermediate gimbal to said shaft means with a predetermined torsional spring rate about a first gimbal torsion spring axis, said second gimbal torsion spring means being a means for coupling a respective intermediate gimbal to said sensitive element with a predetermined torsional spring rate about a second gimbal torsion spring axis.

48. The apparatus of claim 47 wherein said suspension means comprises only one intermediate gimbal and first and second gimbal torsion spring means for said intermediate gimbal.

* * * * *